(12) United States Patent
Peng et al.

(10) Patent No.: US 8,254,040 B2
(45) Date of Patent: Aug. 28, 2012

(54) SUPER-WIDE-ANGLE LENS SYSTEM AND IMAGING MODULE HAVING SAME

(75) Inventors: Fang-Ying Peng, Taipei Hsien (TW); Hai-Jo Huang, Taipei Hsien (TW); Sheng-An Wang, Taipei Hsien (TW); Xiao-Na Liu, Guangdong (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 130 days.

(21) Appl. No.: 12/977,086

(22) Filed: Dec. 23, 2010

(65) Prior Publication Data
US 2012/0099211 A1    Apr. 26, 2012

(30) Foreign Application Priority Data
Oct. 20, 2010   (CN) .......................... 2010 1 0513262

(51) Int. Cl.
*G02B 13/04* (2006.01)
*H04N 5/225* (2006.01)

(52) U.S. Cl. .................... 359/753; 348/340; 359/749

(58) Field of Classification Search .................. 348/335, 348/340; 359/749, 752, 753
See application file for complete search history.

(56) References Cited

U.S. PATENT DOCUMENTS
2012/0105981 A1 * 5/2012 Peng et al. .................... 359/753

FOREIGN PATENT DOCUMENTS
CN            101135767 A    3/2008
* cited by examiner

*Primary Examiner* — David N Spector
(74) *Attorney, Agent, or Firm* — Altis Law Group, Inc.

(57) ABSTRACT

A super-wide-angle lens system for imaging an object on an imaging surface, includes a first lens group with negative refraction power and a second lens group with positive refraction power. The first lens group includes a first spherical lens with negative refraction power, a second spherical lens with negative refraction power, and a third spherical lens with positive refraction power. The first lens has a first surface facing the object side of the first lens group. The second lens group includes a fourth spherical lens with positive refraction power and a fifth spherical lens with negative refraction power. The system satisfies the formulas: $0.01<D/|FG1|<1$, and $2<D/FG2<4$, where D is the distance from the first surface to the imaging surface, FG1 is the effective focal length of the first lens group, and FG2 is the effective focal length of the second lens group.

13 Claims, 4 Drawing Sheets

SUPER-WIDE-ANGLE LENS SYSTEM AND IMAGING MODULE HAVING SAME

BACKGROUND

1. Technical Field

The present disclosure relates to imaging modules and, particularly, to a super-wide-angle lens system for use in an imaging module with compact size.

2. Description of Related Art

Super-wide-angle lens systems having a filed of view greater than 90 degrees are widely used. However, in designing of a super-wide-angle lens system, if it is desired to increase the field of view and image quality of the super-wide-angle lens system then the overall length of the super-wide-angle lens system will be increased as well.

Therefore, it is desirable to provide a super-wide-angle lens system which can overcome the limitations described above.

DETAILED DESCRIPTION

Embodiments of the disclosure will now be described in detail with reference to the accompanying drawings.

Figure 1:
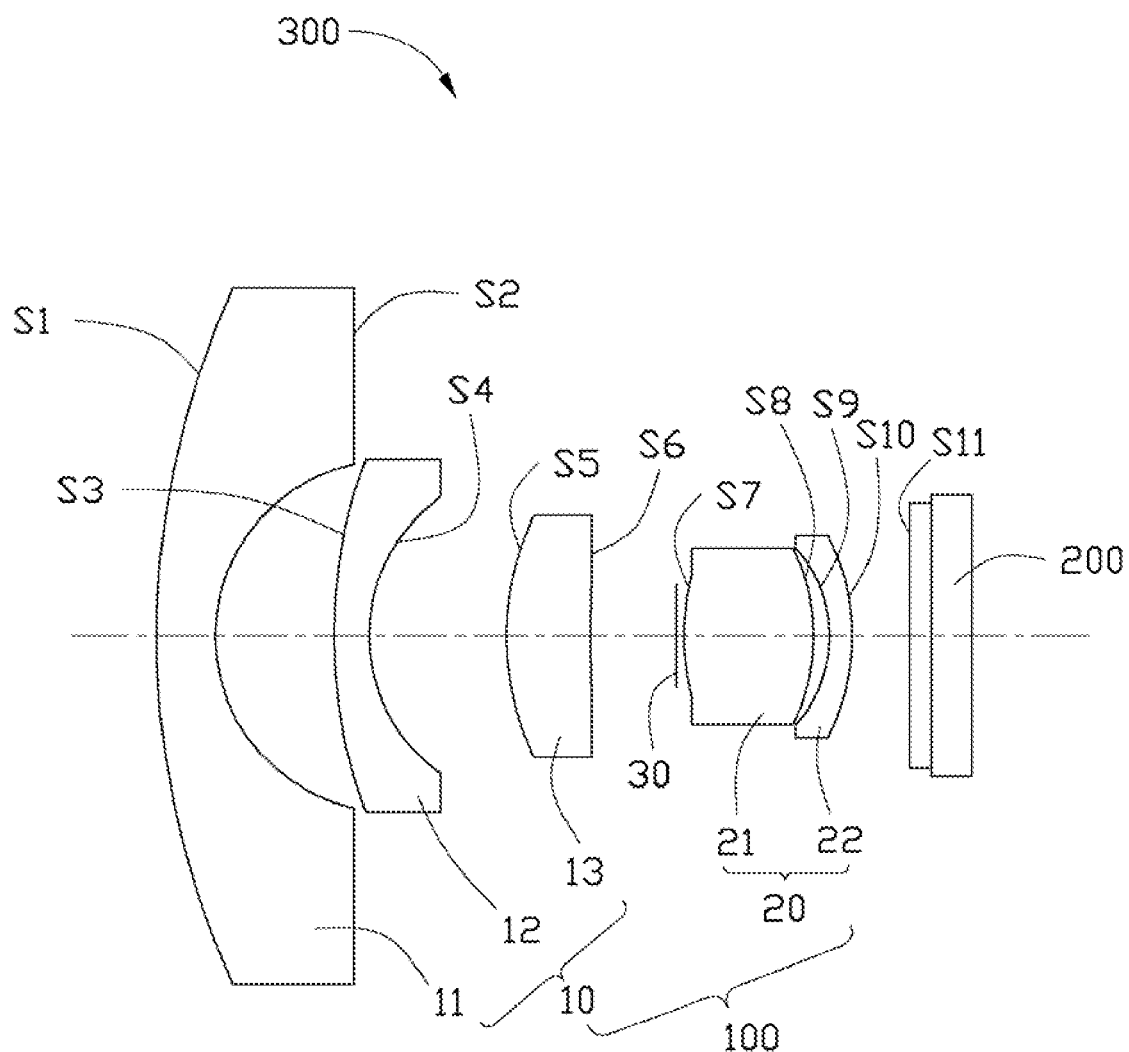
FIG. 1 is a schematic view of an imaging module in accordance with an exemplary embodiment, the imaging module including a super-wide-angle lens system.

Referring to FIG. 1, an imaging module 300, according to an exemplary embodiment, comprises a super-wide-angle lens system 100 and an image sensor 200. The lens system 100 is configured for optically imaging an object on an imaging surface S11. The image sensor 200 is optically aligned with the lens system 100 and positioned at the imaging surface S11.

The lens system 100 includes, in this order from the object side to the image side of the lens system 100, a first lens group 10 with negative refraction power and a second lens group 20 with positive refraction power. The first lens group 10 includes, in this order from the object side to the image side of the lens system 100, a first spherical lens 11 with negative refraction power, a second spherical lens 12 with negative refraction power, and a third spherical lens 13 with positive refraction poser. The second lens group 20 includes, in order from the object side to the image side of the lens system 100, a fourth spherical lens 21 with positive reflection power and a fifth spherical lens 22 with negative reflection power. An aperture 30 is positioned between the third spherical lens 13 and the fourth spherical lens 21.

The first spherical lens 11 includes a convex first surface S1 facing the object side of the lens system 100, and a concave second surface S2 facing the image side of the lens system 100, thereby defining a meniscus shape of the first spherical lens 11. The first and second surfaces S1, S2 are spherical.

The second spherical lens 12 includes a convex third surface S3 facing the object side of the lens system 100, and a concave fourth surface S4 facing the image side of the lens system 100, thereby defining a meniscus shape of the second spherical lens 12. The third and fourth surfaces S3, S4 are spherical.

The third spherical lens 13 includes a convex fifth surface S5 facing the object side of the lens system 100, and a concave sixth surface S6 facing the image side of the lens system 100, thereby defining a meniscus shape of the third spherical lens 13. The fifth and sixth surfaces S5, S6 are spherical.

The fourth spherical lens 21 includes a convex seventh surface S7 facing the object side of the lens system 100, and a convex eighth surface S8 facing the image side of the lens system 100, thereby defining a biconvex shape of the fourth spherical lens 21. The seventh and eighth surfaces S7, S8 are spherical.

The fifth spherical lens 22 includes a concave ninth surface S9 facing the object side of the lens system 100, and a convex tenth surface S10 facing the image side of the lens system 100, thereby defining a meniscus shape of the fifth spherical lens 22. The ninth and tenth surfaces S9, S10 are spherical.

In order to obtain a lens system 100 that has a super wide field of view and a relatively short overall length, the lens system 100 satisfies the formulas:

$$0.01 < D/|FG1| < 1, \text{ and} \qquad (1)$$

$$2 < D/FG2 < 4, \qquad (2)$$

wherein D is the distance from the first surface S1 to the imaging surface S11 on the optical axis of the lens system 100, FG1 is the effective focal length of the first lens group 10, and FG2 is the effective focal length of the second lens group 20.

The lens system 100 further satisfies the formula:

$$0.25 < 1/FG1 + 1/FG2 < 0.45, \qquad (3)$$

wherein 1/FG1 is the diopter of the first lens group 10 and 1/FG2 is the diopter of the second lens group 20. Formula (3) is for increasing the manufacture tolerances of the lenses to decrease the manufacturing cost of the lenses, and for correcting the lateral chromatic aberration and the curvature of field.

The lens system 100 further satisfies the formulas:

$$0.1 < t4/D < 0.3, \qquad (4)$$

$$0.2 < t4/Ds < 0.6, \text{ and} \qquad (5)$$

$$0.3 < 1/FL4 < 0.5, \qquad (6)$$

wherein t4 is the thickness of the fourth spherical lens 21 on the optical axis of the lens system 100, Ds is the distance from the aperture 30 to the imaging surface S11, and the 1/FL4 is the diopter of the fourth spherical lens 21. The formulas (4)-(6) are for obtaining a short overall length of the lens system 100.

The lens system 100 further satisfies the formula:

$$n5 > 1.92, \qquad (7)$$

wherein n5 is the refractive index for the Helium d-line (587.56 nm) of the fifth spherical lens 22. The formula (7) is for obtaining a relatively great diopter of the fifth spherical lens 22, and for obtaining a great image height and decreasing distortion.

The lens system 100 further satisfies the formulas:

$$-4 < FL1/F0 < -2, \qquad (8)$$

$$370 < |FG1|/F0 < 380, \text{ and} \qquad (9)$$

$$2 < FG2/F0 < 4, \qquad (10)$$

wherein FL1 is the effective focus length of the first spherical lens 11 and F0 is the effective focus length of the lens system 100. The formula (8) is for obtaining a super wide field of view with the lens system 100, converging the light rays penetrating the lens system 100, and obtaining a short overall length of the lens system 100. The formulas (9)-(10) are for correcting spherical aberration and distortion.

The lens system 100 further satisfies the formulas:

$$n1>1.75, \tag{11}$$

$$v2>65, \tag{12}$$

$$n3>1.84, \tag{13}$$

$$v3<25, \text{ and} \tag{14}$$

$$v5<20, \tag{15}$$

wherein n1 and n3 are the refractive index for the Helium d-line (587.56 nm) of the first spherical lens 11 and the third spherical lens 13 respectively, v2, v3, and v5 are the Abbe numbers of the second spherical lens 12, the third spherical lens 13, and the fifth spherical lens 22. The formulas (11)-(15) are for converging light rays penetrating the lens system 100.

In this embodiment, the lens system 100 satisfies the parameters of Table 1, wherein D=12.50 mm, FG1=−563 mm, FG2=3.30 mm, t4=1.959 mm, Ds=5.085 mm, FL4=2.350 mm, FL1=−4.30 mm, and F0=1.48 mm. Listed below are the symbols used in Table 1:

R: radius of curvature,
D: distance between surfaces on the optical axis,
Nd: refractive index for the Helium d-line (587.56 nm) of lens, and
Vd: Abbe number.

TABLE 1

| surface | R (mm) | D (mm) | Nd | Vd |
|---|---|---|---|---|
| S1 | 11.505 | 0.825 | 1.77 | 47.8 |
| S2 | 2.466 | 1.678 | | |
| S3 | 7.052 | 0.5 | 1.52 | 65.1 |
| S4 | 2.33 | 1.92 | | |
| S5 | 3.878 | 1.18 | 1.84 | 24.6 |
| S6 | 37.211 | 1.137 | | |
| 30 | | 0.15 | | |
| S7 | 3.886 | 1.959 | 1.786 | 50.00 |
| S8 | −2.775 | 0.228 | | |
| S9 | −1.993 | 0.325 | 1.92 | 18.9 |
| S10 | −3.128 | 0.803 | | |
| S11 | | 0.3 | 1.516 | 64.167 |

In this embodiment, the lens system 100 also satisfies the parameters of Table 2, listed below are the symbols used in Table 2:

2ω: field angle,
FNo: f number.

TABLE 2

| 2ω | 174 |
|---|---|
| FNo | 2.5 |

Figure 2:
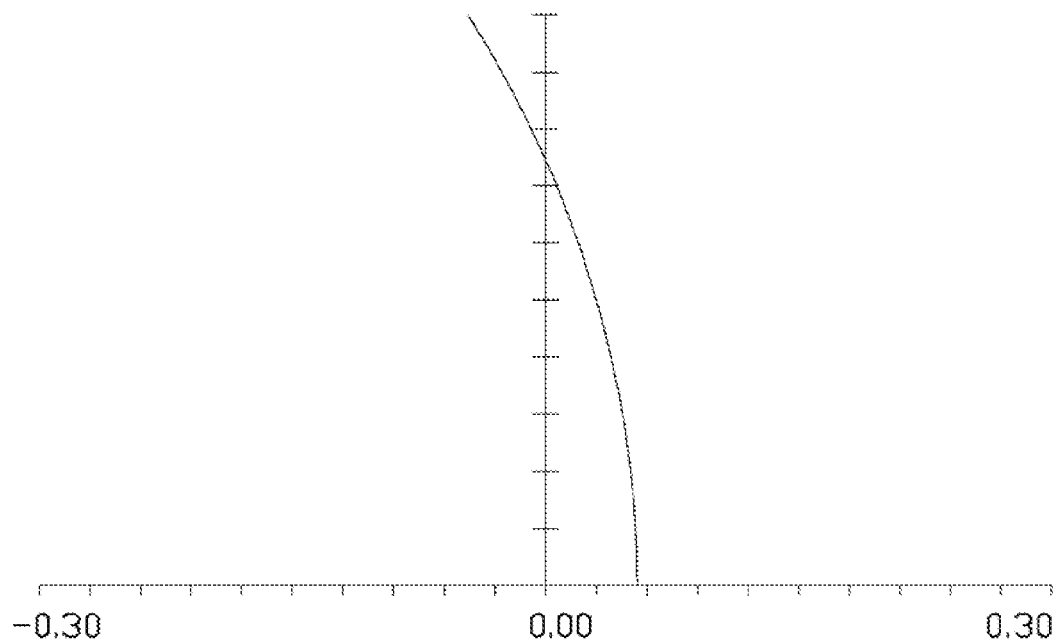
FIG. 2 is a spherical aberration graph of the lens system of FIG. 1.
Figure 3:
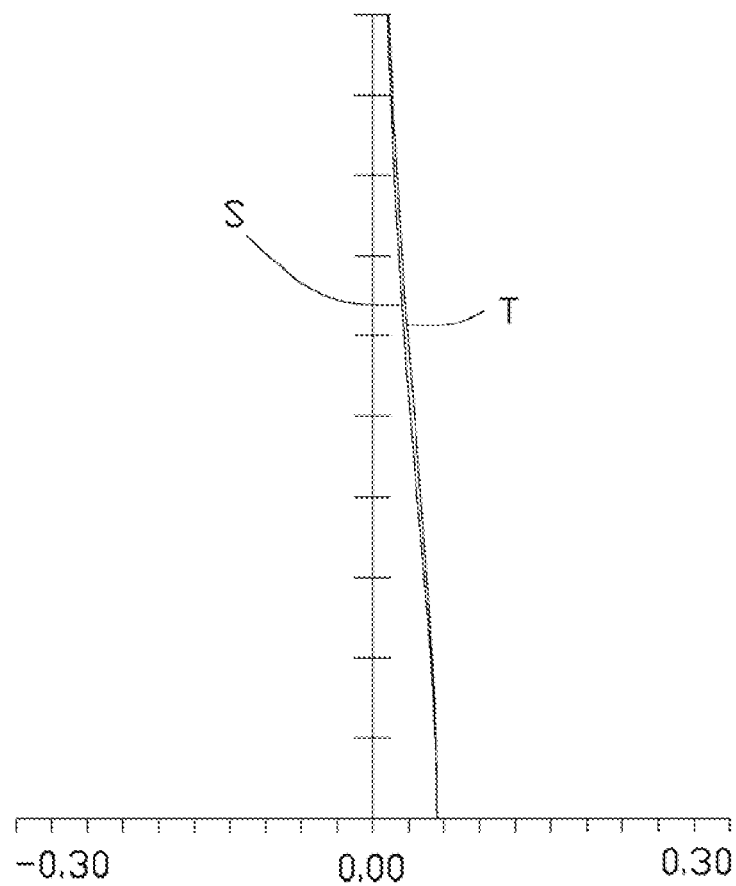
FIG. 3 is a field curvature graph of the lens system of FIG. 1.
Figure 4:
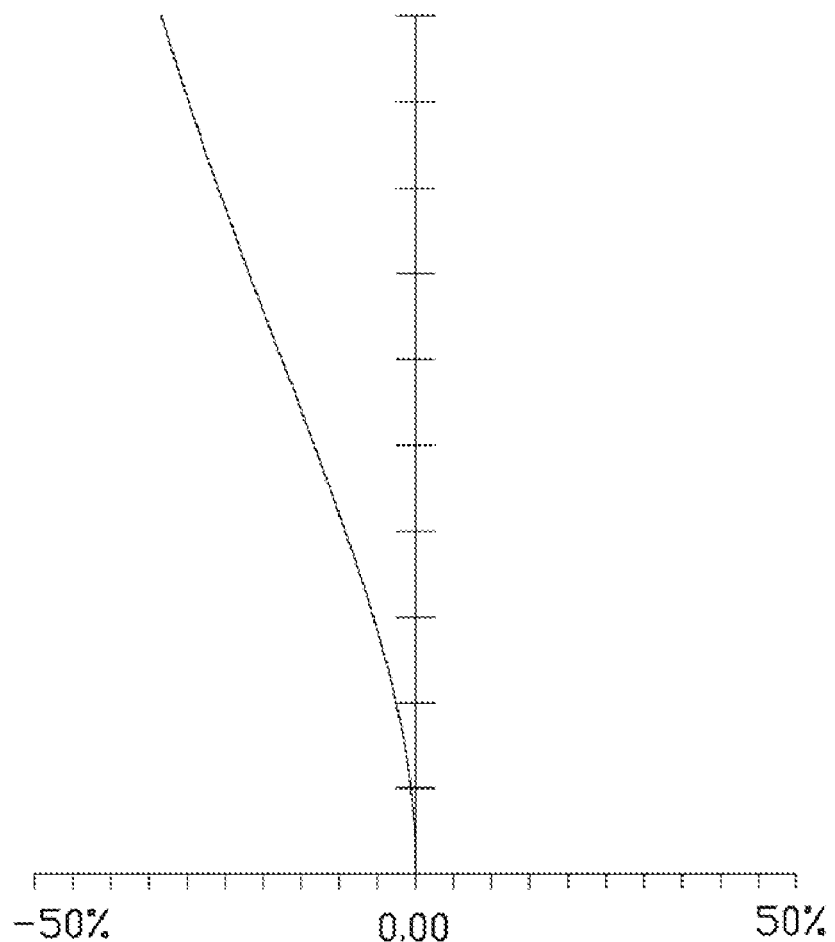
FIG. 4 is a distortion graph of the lens system of FIG. 1.

The spherical aberration graph, the field curvature graph, and the distortion graph of the lens system 100 are respectively shown in FIGS. 2~4. Spherical aberrations of line d (λ=587 nm) is shown in FIG. 2. Generally, spherical aberration of visible light (with a wavelength between 400~700 nm) of the lens system 100 is within a range of −0.06 mm to 0.06 mm. The sagittal field curvature and tangential field curvature shown in FIG. 3 are kept within a range of 0 mm to 0.06 mm. The distortion in FIG. 4 falls within a range of −50% to 0%. Obviously, the spherical aberration, field curvature, and distortion are well controlled in the lens system 100.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A super-wide-angle lens system for imaging an object on an imaging surface, comprising:
   a first lens group with negative refraction power comprising, in the order from the object side to the image side thereof, a first spherical lens with negative refraction power, a second spherical lens with negative refraction power, and the third spherical lens with positive refraction power, the first spherical lens having a first surface facing the object side of the first lens group;
   a second lens group with positive refraction power comprising, in the order from the object side to the image side thereof, a fourth spherical lens with positive reflection power and a fifth spherical lens with negative reflection power; and
   wherein the super-wide-angle lens system satisfies the formulas:

$$0.01<D/|FG1|<1; \text{ and} \tag{1}$$

$$2<D/FG2<4; \tag{2}$$

where D is the distance from the first surface to the imaging surface along the optical axis of the lens system, FG1 is the effective focal length of the first lens group, and FG2 is the effective focal length of the second lens group.

2. The super-wide-angle lens system as claimed in claim 1, wherein the lens system further satisfies the formula:

$$0.25<1/FG1+1/FG2<0.45, \tag{3}$$

where 1/FG1 is the diopter of the first lens group, and 1/FG2 is the diopter of the second lens group.

3. The super-wide-angle lens system as claimed in claim 1, wherein the lens system comprises an aperture positioned between the first lens group and the second lens group, the lens system further satisfies the formulas:

$$0.1<t4/D<0.3; \tag{4}$$

$$0.2<t4/Ds<0.6; \text{ and} \tag{5}$$

$$0.3<1/FL4<0.5; \tag{6}$$

where t4 is the thickness of the fourth spherical lens along the optical axis of the lens system, Ds is the distance from the aperture to the imaging surface, and the 1/FL4 is the diopter of the fourth spherical lens.

4. The super-wide-angle lens system as claimed in claim 1, wherein the lens system further satisfies the formula:

$$n5>1.92, \tag{7}$$

where n5 is the refractive index for the Helium d-line of the fifth spherical lens.

5. The super-wide-angle lens system as claimed in claim 1, wherein the lens system further satisfies the formulas:

$$-4<FL1/F0<-2; \tag{8}$$

$$370<|FG1|/F0<380; \text{ and} \tag{9}$$

$$2<FG2/F0<4; \tag{10}$$

where FL1 is the effective focus length of the first spherical lens, and F0 is the effective focus length of the lens system.

6. The super-wide-angle lens system as claimed in claim 1, wherein the lens system further satisfies the formulas:

$n1 > 1.75;$ (11)

$v2 > 65;$ (12)

$n3 > 1.84;$ (13)

$v3 < 25;$ and (14)

$v5 < 20;$ (15)

where n1 and n3 are the refractive index for the Helium d-line of the first spherical lens and the third spherical lens respectively, v2, v3, and v5 are the Abbe numbers of the second spherical lens, the third spherical lens, and the fifth spherical lens.

7. An imaging module comprising:
a super-wide-angle lens system for imaging an object on an imaging surface, the lens system comprising:
a first lens group with negative refraction power comprising, in the order from the object side to the image side thereof, a first spherical lens with negative refraction power, a second spherical lens with negative refraction power, and the third spherical lens with positive refraction power, the first spherical lens having a first surface facing the object side of the first lens group; and
a second lens group with positive refraction power comprising, in the order from the object side to the image side thereof, a fourth spherical lens with positive reflection power and a fifth spherical lens with negative reflection power; and
an image sensor placed aligned with the lens system and placed at the imaging surface;
wherein the lens system satisfies the formulas:

$0.01 < D/|FG1| < 1;$ and (1)

$2 < D/FG2 < 4;$ (2)

where D is the distance from the first surface to the imaging surface along the optical axis of the lens system, FG1 is the effective focal length of the first lens group, and FG2 is the effective focal length of the second lens group.

8. The imaging module as claimed in claim 7, wherein the lens system further satisfies the formula:

$0.25 < 1/FG1 + 1/FG2 < 0.45,$ (3)

where 1/FG1 is the diopter of the first lens group, and 1/FG2 is the diopter of the second lens group.

9. The imaging module as claimed in claim 7, wherein the lens system comprises an aperture positioned between the first lens group and the second lens group, the lens system further satisfies the formulas:

$0.1 < t4/D < 0.3;$ (4)

$0.2 < t4/Ds < 0.6;$ and (5)

$0.3 < 1/FL4 < 0.5;$ (6)

where t4 is the thickness of the fourth spherical lens along the optical axis of the lens system, Ds is the distance from the aperture to the imaging surface, and the 1/FL4 is the diopter of the fourth spherical lens.

10. The imaging module as claimed in claim 7, wherein the lens system further satisfies the formula:

$n5 > 1.92,$ (7)

where n5 is the refractive index for the Helium d-line of the fifth spherical lens.

11. The imaging module as claimed in claim 7, wherein the lens system further satisfies the formulas:

$-4 < FL1/F0 < -2;$ (8)

$370 < |FG1|/F0 < 380;$ and (9)

$2 < FG2/F0 < 4;$ (10)

where FL1 is the effective focus length of the first spherical lens, and F0 is the effective focus length of the lens system.

12. The imaging module as claimed in claim 7, wherein the lens system further satisfies the formulas:

$n1 > 1.75;$ (11)

$v2 > 65;$ (12)

$n3 > 1.84;$ (13)

$v3 < 25;$ and (14)

$v5 < 20;$ (15)

where n1 and n3 are the refractive index for the Helium d-line of the first spherical lens and the third spherical lens respectively, v2, v3, and v5 are the Abbe numbers of the second spherical lens, the third spherical lens, and the fifth spherical lens.

13. The imaging module as claimed in claim 7, wherein the lens system further comprises an aperture positioned between the third spherical lens and the fourth spherical lens.

* * * * *